Jan. 9, 1923.

Re. 15,525.

N. W. STORER.

SYSTEM OF CONTROL.

ORIGINAL FILED APR. 12, 1921.

2 SHEETS—SHEET 1.

WITNESSES:

A. G. Schiefelbein

M. Theodore Simmons

INVENTOR

Norman W. Storer.

BY

Wesley G. Carr

ATTORNEY

Jan. 9, 1923. Re. 15,525.

N. W. STORER.

SYSTEM OF CONTROL.

ORIGINAL FILED APR. 12, 1921.

2 SHEETS—SHEET 2.

WITNESSES:

G. G. Schiefelbein

M. Theodore Simmons.

INVENTOR

Norman W. Storer.

BY

Wesley G. Carr

ATTORNEY

Reissued Jan. 9, 1923. Re. 15,525

UNITED STATES PATENT OFFICE.

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Original No. 1,374,535, dated April 12, 1921, Serial No. 193,687, filed September 28, 1917. Application for reissue filed August 18, 1921, Serial No. 493,459. Divided and this application filed November 25, 1921. Serial No. 518,476.

DIVISION B.

*To all whom it may concern:*

Be it known that I, NORMAN W. STORER, a citizen of the United States, and a resident of Pittsburgh, in the county of Allegheny and State of Pennsylvania, have invented a new and useful Improvement in Systems of Control, of which the following is a specification, this application being Division B of application, Serial No. 493,459, filed Aug. 18, 1921, Norman W. Storer, Systems of control, said application being an application for reissue of Letters Patent No. 1,374,535, granted April 12, 1921.

My invention relates to systems of control and especially to the control of a relatively large number of dynamo-electric machines that are employed in connection with high-voltage railway circuits, for example.

One object of my invention is to provide a relatively simple and reliable system of the above-indicated character, wherein the machines are arranged in successive groupings that form a non-geometrical series to provide a plurality of speed ranges.

More specifically stated, it is the object of my invention to provide a high-voltage control system embodying a relatively large number of dynamo-electric machines, which number may be represented by $x$, for instance, and for successively and operatively connecting to the supply circuit one group of $x$ machines in series relation, two groups of $\frac{x}{2}$ machines in parallel relation and three groups of $\frac{x}{3}$ machines in parallel relation, the corresponding armatures and field windings being maintained in series relation at all times.

Heretofore, it has been proposed to employ groups of four driving motors for electric vehicles and to connect such motors in the familiar series, series-parallel and parallel relations to effect acceleration of the vehicle. Thus, the motors have been successively grouped in accordance with a geometrical ratio. According to my present invention, however, I employ a larger number of motors, such as 6, for example, and successively group them in accordance with a non-geometrical series, employing one group of six motors in series relation initially, two parallel-related groups of three motors in series relation secondly, and three parallel-related groups of two motors in series relation finally. The numbers of parallel paths of the successive groups thus form an arithmetical series. In this way, I not only provide a simple and reliable control system for high-voltage operation wherein a safe voltage per commutator is never exceeded, but, in addition, a smoothly-accelerating and relatively economical system, with respect to the utilization of accelerating resistors, is also produced.

My invention is further adapted to accomplish other minor objects, as will be evident from the following detailed description and as pointed out with particularity in the appended claims.

The present application is a division of my copending application for U. S. Letter Patent, bearing Serial No. 493,459, filed Aug. 18, 1921.

In the accompanying drawings, illustrating my invention,

Figure 1:
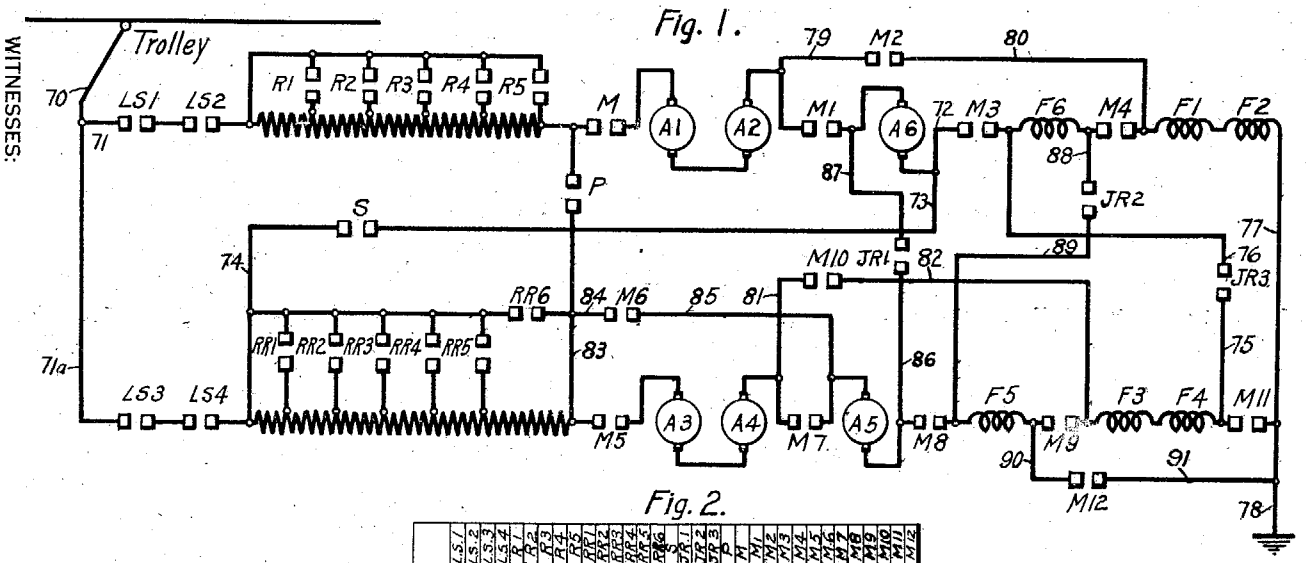
Figure 1 is a diagrammatic view of the main circuits of a system of control embodying my invention.

Referring to Fig. 1 of the drawings, the system shown comprises suitable supply circuit conductors Trolley and Ground; a plurality of main dynamo-electric machines respectively having commutator type armatures A1 to A6, inclusive, and field windings F1 to F6, inclusive, of the series type; a plurality of circuit-governing switches LS1, LS2, LS3 and LS4, which effect direct connection to the high-voltage supply conductor trolleys R1 to R5, inclusive, and RR1 to RR6, inclusive, which are respectively arranged to vary the active circuit values of the accelerating resistors 1 and 2; series-connecting switches JR1, JR2 and JR3; parallel-connecting switches M1, M4, M6 and M10; and other switches P, M, M2, M3, M5, M7 and M8 that are employed during one or more of the ranges of operating speeds of the main motors, as subsequently set forth herein in detail.

Figure 2:
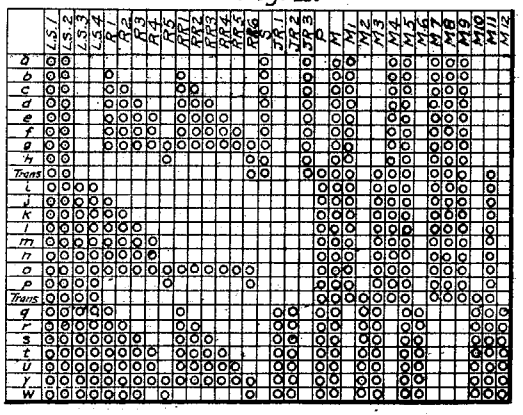
Fig. 2 is a sequence chart, of well-known form, indicating the preferred order of operation of the various switches that are shown in Fig. 1.

Assuming that it is desired to effect acceleration of the illustrated motors, the switches LS1, LS2, S, JR3, M, M1, M4, M5, M7, M8 and M9 are closed, as indicated by step *a* of the sequence chart, Fig. 2. Under such circumstances, the machine circuit is established from the trolley through conductors 70 and 71, line switches LS1 and LS2, the entire resistor 1, switch M, armatures A1 and A2, switch M1, armature A6, conductors 72 and 73, switch S, conductor 74, the entire accelerating resistor 2, switch M5, armatures A3 and A4, switch M7, armature A5, switch M8, field winding F5, switch M9, field windings F3 and F4, conductor 75, switch JR3, conductor 76, field winding F6, switch M4, field windings F1 and F2 and conductors 77 and 78 to the negative supply-circuit conductor Ground.

Figure 3:
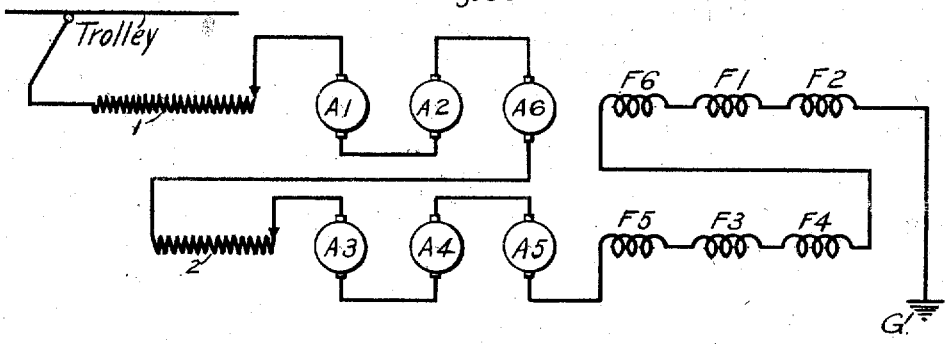
Figs. 3, 4 and 5 are diagrammatic views illustrating the circuit connections for the various operating speed ranges.

The simplified circuits for such series connection of the motor elements is shown in Fig. 3.

As indicated by steps *b* to *h*, inclusive, of the sequence chart, the various resistor-short-circuiting switches may be closed in any desired order to gradually effect acceleration of the machines to the maximum speed corresponding to the series connection thereof.

To effect transition of the machines to the first series-parallel relation, wherein two parallel-related sets of three motors each are employed, the resistor short-circuiting switch R5 is first opened to insert the resistor 1 in circuit, and switches P, M3 and M11 are closed. At this time, therefore, a shunting transition circuit is completed from one terminal of the switch M3 through conductor 73, switch S, conductor 74, switches RR6 and M5, armatures A3 and A4, switch M7, armature A5, switch M8, field winding F5, switch M9, field windings F3 and F4, conductor 75, switch JR3 and conductor 76 to the other terminal of the switch M3. The series-connecting switches S and JR3 and the resistor short-circuiting switch RR6 are then opened and line switches LS3 and LS4 are closed to complete the motor transition, in accordance with the following circuits: one circuit is established from the trolley through conductors 70 and 71, line switches LS1 and LS2, resistor 1, switch M, armatures A1 and A2, switch M1, armature A6, conductor 72, switch M3, field winding F6, switch M4 and field windings F1 and F2 to the negative conductor 77.

Figure 4:
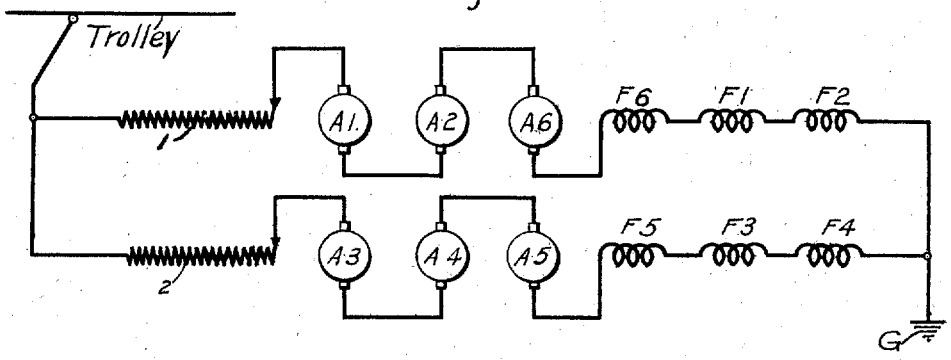

A similar circuit is completed from the positively-energized conductor 70 through conductor 71a, line switches LS3 and LS4, accelerating resistor 2, switch M5, armatures A3 and A4, switch M7, armature A5, switch M8, field winding F5, switch M9, field windings F3 and F4 and switch M11 to the negative conductor 77. The machines are thus connected in the series-parallel relation that is simply illustrated in Fig. 4.

In the transition position, the switch P is also closed to connect the accelerating resistors 1 and 2 in parallel relation, and the switch is maintained closed throughout the remaining motor operation for the previously-described purpose of suitably reducing the effective resistance value in circuit with the parallel-related sets of motors.

Upon movement of the governing controller through positions *j* to *p*, inclusive, the accelerating resistors 1 and 2 are again gradually short-circuited to increase the machine speed to the maximum value obtainable with the new motor connections.

To effect the second transition of the machines to a series-parallel relation, wherein three parallel-related sets of two motors each are employed, the resistors 1 and 2 are first re-inserted in circuit and switches M2 and M10 are then closed. In this way, the armature A6 is connected through a shunting circuit including switch M1, conductor 79, switch M2, conductor 80, switch M4, field winding F6, switch M3 and conductor 72, while the armature A5 is connected in a similar circuit comprising switch M7, conductor 81, switch M10, conductor 82, switch M9, field winding F5 and switch M8. Switches JR1, JR2, M6 and M12 are next closed and switches M1, M4, M7, M8 and M9 are opened to complete the desired motor transition in accordance with the following circuits, one of which is established from the trolley through conductor 70, line switches LS1 and LS2, resistor 1, switch M, armatures A1 and A2, conductor 79, switch M2, conductor 80 and field windings F1 and F2 to the negative conductor 77.

A second circuit is completed through the line switches LS3 and LS4 and resistor 2, where the circuit divides, one branch including switch M8, armatures A3 and A4, conductor 81, switch M10, conductor 82, field windings F3 and F4 and switch M11 to the negative conductor 77, and the other branch including conductors 83 and 84, switch M6, conductor 85, armature A5, conductor 86, switch JR1, conductor 87, armature A6, conductor 72, switch M3, field winding F6, conductor 88, switch JR2, conductor 89, field winding F5, conductor 90, switch M12, and conductor 91 to the negative conductor 78.

Figure 5:
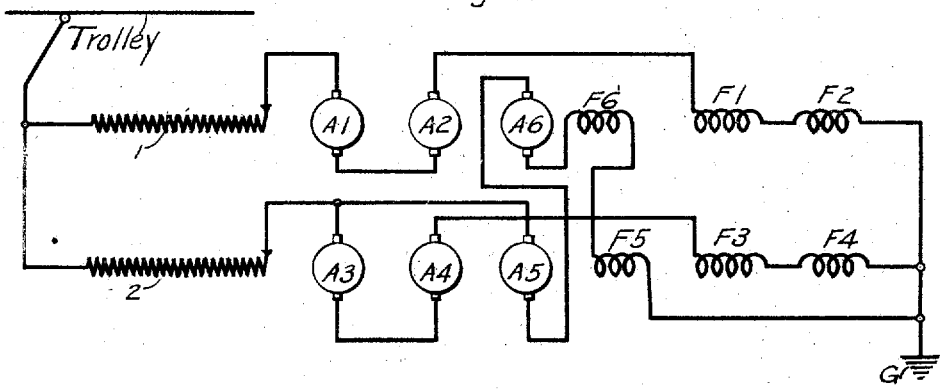

The simplified motor connections, at this time, are illustrated in Fig. 5. The resistors 1 and 2 are then gradually short-circuited, as indicated in the sequence chart, to effect acceleration of the machines to the maximum speed value.

In preserving the same reference characters as appear in the parent application, Serial No. 193,687, it is not intended to indicate that the numerical order of characters is the preferred order of arrangement of the machines. On the other hand, by reference to the drawings, and the connection of the machine in the respective electrical circuits, it will be noted that the machines are actually connected in the order, reading from left to right, of first, second, third, fourth, fifth and sixth machines. In other words, the ordinals by which the several motors are designated in the claims refer to the numerical order of the motors in the series connection thereof rather than to the numerical part of the reference characters that are appended to them.

It will be noted that the system shown in Fig. 1 maintains the field windings on the ground or negative side of the armatures throughout operation, the advantages of which, such as the relatively simple and inexpensive insulation requirements, are well known in the prior art and need not be set forth here.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:—

1. In a system of control, the combination with a supply circuit and six dynamo-electric machines respectively having armature windings A1 to A6 and field windings F1 to F6, of means for connecting the several machine windings to the supply circuit in the following groupings to produce three different ranges of operating speeds:—A1, A2, A6, A3, A4, A5, F5, F3, F4, F6, F1 and F2; A1, A2, A6, F6, F1 and F2 in parallel relation to A3, A4, A5, F5, F3 and F4; and A1, A2, F1 and F2 in parallel relation to A3, A4, F3 and F4 and also to A5, A6, F6 and F5.

2. In a system of control, the combination with a supply circuit and six dynamo-electric machines severally having armatures and field windings, of means for initially connecting all the armatures and field windings to the supply circuit in series relation, for subsequently connecting the machines in two parallel groups to the supply circuit, respectively including the first, second, and third machines, and the fourth, fifth and sixth machines, and for finally connecting the machines in three parallel groups to the supply circuit, respectively including the first and second machines, the fourth and fifth machines, and the third and sixth machines, closed machine circuits being maintained throughout the machine operation.

3. In a system of control, the combination with six dynamo-electric machines severally having armatures and field windings, of means for initially connecting all the armatures and field windings in series relation, for subsequently connecting the machines in two parallel groups, respectively including the first, second and third machines, and the fourth, fifth and sixth machines, and for finally connecting the machines in three parallel groups, respectively including the first and second machines, the fourth and fifth machines, and the third and sixth machines, the corresponding armatures and field windings being maintained in series relation and closed machine circuits being maintained throughout the machine operation.

4. In a system of control, the combination with a supply circuit and six dynamo-electric machines severally having armatures and field windings, of means for initially connecting all the armatures and field windings to the supply circuit in series relation, for subsequently connecting the machines in two parallel groups to the supply circuit, respectively including the first, second and third machines, and the fourth, fifth and sixth machines, and for finally connecting the machines in three parallel groups to the supply circuit, respectively including the first and second machines, the fourth and fifth machines, and the third and sixth machines, said field windings being maintained upon the negative side of the respective armatures throughout the machine operation.

5. In a system of control, the combination with a supply circuit and six dynamo-electric machines severally having armatures and field windings, of means for initially connecting all the armatures and field windings to the supply circuit in series relation, for subsequently connecting the machines in two parallel groups to the supply circuit, respectively including the first, second and third machines, and the fourth, fifth and sixth machines, and for finally connecting the six machines in three parallel groups to the supply circuit, continuous closed-circuit transitions being employed in all cases.

6. In a system of control, the combination with six dynamo-electric machines severally having armatures and field windings, of means for initially connecting all the armatures and field windings in series relation, for subsequently connecting the machines in two parallel groups, and for finally connecting the machines in three parallel groups, respectively including the first and second machines, and fourth and fifth machines, and the third and sixth machines, continuous closed-circuit transitions being employed in all cases.

7. In a system of control, the combination with a supply circuit and six dynamo-electric machines severally having armatures and field windings, of means for initially connecting all the armatures and field windings to the supply circuit in series relation, for subsequently connecting the machines in two parallel groups to the supply circuit, respectively including the first, second and third machines, and the fourth, fifth and sixth machines, and for finally connecting the machines in three parallel groups to the supply circuit, said field windings being maintained upon the negative side of the respective armatures throughout the machine operation.

8. In a system of control, the combination with a supply circuit and six dynamo-electric machines severally having armatures and field windings, of means for initially connecting all the armatures and field windings to the supply circuit in series relation in a certain order, for subsequently connecting the machines in two parallel groups, respectively including the first, second and third machines, and the fourth, fifth and sixth machines, and for finally connecting the machines in three parallel groups, respectively including the first and second machines, the fourth and fifth machines, and the sixth and third machines, all of the field windings being maintained on a predetermined side of all of the armatures throughout the machine operation.

In testimony whereof, I have hereunto subscribed my name this 23rd day of November 1921.

NORMAN W. STORER.